United States Patent
Thies et al.

(10) Patent No.: US 7,655,298 B2
(45) Date of Patent: Feb. 2, 2010

(54) PREPARATION OF A MECHANICALLY DURABLE SINGLE LAYER COATING WITH ANTI-REFLECTIVE PROPERTIES

(75) Inventors: Jens Christoph Thies, Maastricht (NL); Edwin Currie, Sittard (NL); Guido Jozefina Wilhelmus Meijers, Stein (NL)

(73) Assignee: DSM IP Assets B.V., Heerlen (NL)

( * ) Notice: Subject to any disclaimer, the term of this patent is extended or adjusted under 35 U.S.C. 154(b) by 339 days.

(21) Appl. No.: 10/533,094

(22) PCT Filed: Nov. 4, 2003

(86) PCT No.: PCT/NL03/00770

§ 371 (c)(1), (2), (4) Date: May 23, 2005

(87) PCT Pub. No.: WO2004/042434

PCT Pub. Date: May 21, 2004

(65) Prior Publication Data

US 2006/0014012 A1    Jan. 19, 2006

(30) Foreign Application Priority Data

Nov. 6, 2002  (EP) .................................. 02079649

(51) Int. Cl.
*B32B 18/00* (2006.01)
*B32B 15/00* (2006.01)

(52) U.S. Cl. ........................ 428/325; 428/432; 428/532

(58) Field of Classification Search ....................... None
See application file for complete search history.

(56) References Cited

U.S. PATENT DOCUMENTS 3,783,075 A * 1/1974 Land ........................... 156/182

(Continued)

FOREIGN PATENT DOCUMENTS

| EP | 1 146 093 | 10/2001 |
| EP | 1 146 093 A1 * | 10/2001 |
| WO | WO 01/29148 | 4/2001 |

OTHER PUBLICATIONS

Chen, D., Solar Energy Materials & Solar Cells 68 (2001) 313-336 "Anti-reflection (AR) coatings made by sol-gel processes: A review."

(Continued)

*Primary Examiner*—Timothy M Speer
(74) *Attorney, Agent, or Firm*—Nixon & Vanderhye P.C.

(57) ABSTRACT

Single layer anti-reflective hard-coat and methods of making same are disclosed and in particular comprise a structured surface, preferably a nano-structured surface. The hard-coat preferably a hardness above 0.5 GPa, more preferably above 0.7 GPa and most preferably above 1.0 GPa as measured by nano-indentation and/or a reduced tensile modulus above 3 GPa, more preferably above 8.5 GPa or 20 GPa, most preferably above 40 GPa as measured by nano-indentation and/or a scratch resistance above 5 mJ μm-3, preferably above 15 or 30 mJ μm-3, preferably above 60 mJ μm-3 as measured by nano-indentation, and/or contains an amount of inorganic nano-particles from 5 to 75 weight %, preferably from 15 to 50 weight % relative to the weight of the second material present in the hard-coat. Preferably, the spatial length scale of the refractive index gradient in the single layer hard-coat is between 10 and 1000 nm; in particular between 100 and 200 nm.

11 Claims, 9 Drawing Sheets

U.S. PATENT DOCUMENTS

| | | | |
|---|---|---|---|
| 4,139,506 A * | 2/1979 | Thoese et al. | 524/37 |
| 5,582,859 A | 12/1996 | Tong et al. | |
| 5,667,888 A * | 9/1997 | Yoshida et al. | 428/336 |
| 2002/0090507 A1 * | 7/2002 | Barth et al. | 428/336 |
| 2002/0122925 A1 * | 9/2002 | Liu et al. | 428/212 |
| 2003/0068486 A1 * | 4/2003 | Arney et al. | 428/323 |

OTHER PUBLICATIONS

Ibn-Elhaj, Mohammed et al, Nature, vol. 410, Apr. 12, 2001, pp. 796-799 "Optical polymer thin films with isotropic and anisotropic nano-corrugated surface topologies."

Steiner, et al, Science, vol. 283, Jan. 22, 1999, pp. 520-522 "Nanophase-Separated Polymer Films as High-Performance Antireflection Coatings."

Ibn-Elhaj et al, "Optical polymer thin films with isotropic and anisotropic nano-corrugated surface topologies", Nature, McMillan Journals Ltd. London, GB, vol. 410, 12, Apr. 12, 2001.

Walheim et al, "Nanophase-separated polymer films as high-performance antireflection coatings", Science, American Association for the Advancement of Science, New York, US, vol. 283, No. 5401, Jan. 22, 1999.

* cited by examiner

Figure 1:
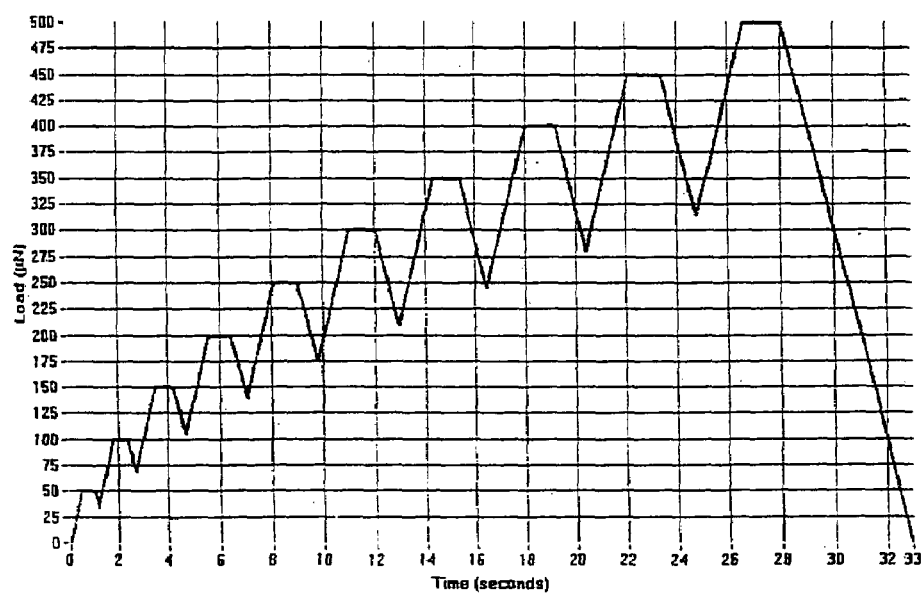

Figure 1. Typical Load-Function used for the indentation Experiments

PRIOR ART

PRIOR ART

Formula 2: Int-12A
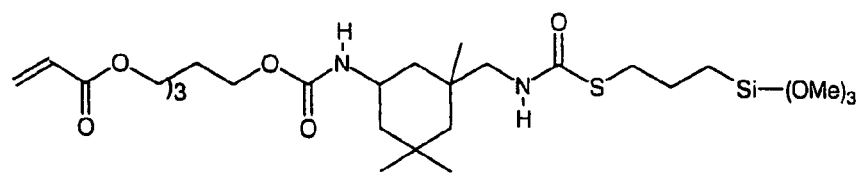
Formula 3: Liquid crystalline diacrylate
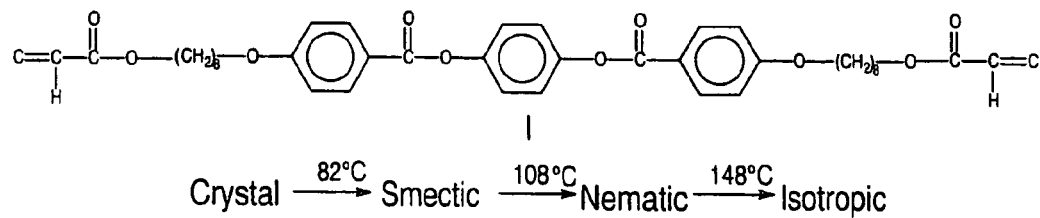
Crystal $\xrightarrow{82°C}$ Smectic $\xrightarrow{108°C}$ Nematic $\xrightarrow{148°C}$ Isotropic
Figure 8B

PREPARATION OF A MECHANICALLY DURABLE SINGLE LAYER COATING WITH ANTI-REFLECTIVE PROPERTIES

This application is the US national phase of international application PCT/NL2003/000770 filed 4 Nov. 2003 which designated the U.S. and claims benefit of EP 02079649.6, dated 6 Nov. 2002, the entire content of which is hereby incorporated by reference.

BACKGROUND SUMMARY AND DETAILED DESCRIPTION

The invention relates to a mechanically durable, single coating with anti-reflective properties, process for manufacturing such a coating and to compositions for the manufacturing of such a coating. The coatings typically exhibit a nano-structured surface.

Mechanically durable coatings, also known as hard-coats, are well known for their hardness, modulus, scratch resistance and optical transparency. Generally, a combination of these properties is achieved by combining chemically crosslinked materials with inorganic fillers whose dimensions are in the nanometer range, thus resulting in filled materials transparent to light in the visible wavelengths range. [Atushi et al (Conference proceedings, RadTech, Asia, 1997)]

Whilst these coatings are optically transparent, they are also smooth and as is the case for all smooth coatings this results in a certain degree of reflection of light from the coating/air interface (D. Chen, Solar Energy Materials & Solar Cells, 86 (2001) 313-336). This property has been recognized in the art as a problem in many different applications (D. Chen, Solar Energy Materials & Solar Cells, 86 (2001) 313-336) and has been addressed by tailoring of the thickness of the applied coating and its respective refractive index. This may lead to improved anti-reflective performance, as measured by an increase in transmission of light with respect to the substrate. It has been shown that it is possible to achieve an increase in transmission over the whole visible region of the light spectrum by preparing multilayer systems of coatings in which each coating has a carefully selected thickness and refractive index (U.S. Pat. No. 5,582,859).

However, multilayer coatings suffer from two sets of problems. The first is that the anti-reflective performance of multilayer coatings suffers from angle-dependency (D. Chen, Solar Energy Materials & Solar Cells, 86 (2001) 313-336). This means that transmission will vary from the normal to oblique angles. Secondly, reproducible processing of such multilayer coatings with precisely controlled thickness and optical properties is difficult and therefore costly and time-consuming.

Alternatively, a single coating can be made anti-reflective by having a controlled surface structure. (Steiner et al., Science, Vol 283, pg 520-522, 1999, Ibn-Elhaj and Schadt, Nature, Vol 410, pg 796-799, 2001). Such single anti-reflective coatings based on controlled surface structure exhibit less angle-dependency of their optical properties but do not possess the attractive mechanical robustness of hard-coats. This is especially relevant for films used in anti-reflective applications, as these are often very thin.

Therefore, it would be desirable to have a coating system with the mechanical robustness of a hard-coat that may be applied as a single layer while still having sufficient anti-reflective properties.

Thus, the object of the present invention is to provide a coating comprising an anti-reflective surface that has the durable mechanical properties of hard coats (hardness, modulus, scratch resistance) but which achieve anti-reflective properties in a single coating.

It has now been found that single layer anti-reflective hard-coats may be manufactured by a process comprising the steps of:

a) applying a mixture on a substrate, which mixture comprises
   i) at least a first material which does not crosslink under the conditions chosen in step b)
   ii) at least a second material which does crosslink under the conditions chosen in step b)
   iii) nano-particles, and
   iv) optionally at least one solvent, b) inducing crosslinking in the mixture applied to the substrate, c) subsequently removing at least part of the first material.

Advantageously, the mixture in step a) is a homogenous mixture. In the framework of the invention, a mixture is homogenous when the mixture does not scatter visible light after application to the substrate and prior to crosslinking, the scattering being observed as cloudiness in the film by the naked eye and/or a loss of transmission of light in the visible region of the electromagnetic spectrum. Furthermore, phase separation prior to crosslinking may also be observed by optical, optionally polarizing, microscopy, as is often done to determine the miscibility of polymer blends.

Figure 6:
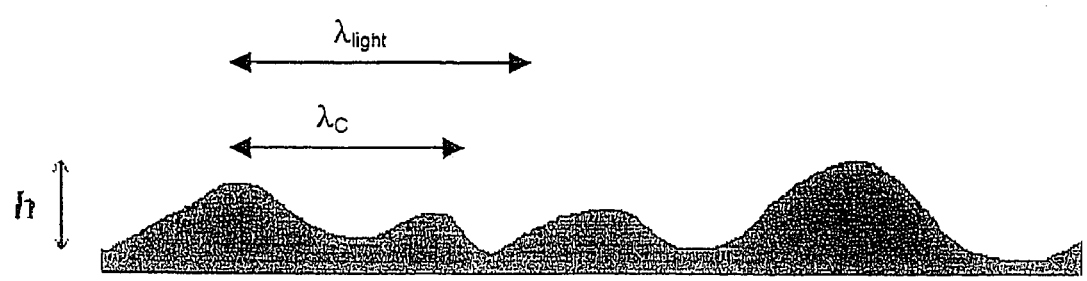

In the framework of the invention the term "(nano) structured surface" refers to a surface which exhibits ridges and troughs that may be randomly distributed, see FIG. 6. More specifically the height of the ridges (h) and the average distance ($\lambda_C$) between the ridges should be in the micrometer to nanometer range. In a preferred embodiment suitable for anti-reflective applications the height of the ridges (h) should be in the range of 50-200 nm and the lateral distance between ridges ($\lambda_C$) should be shorter than the shortest wavelengths of visible light ($\lambda_{light}$), such as less than 400 nm.

Anti-reflective films or coatings are herein defined as films or coatings that (when deposited onto glass as a substrate) have a transmission higher than the transmission of the substrate in at least part of the visible light spectrum. Typically, such films are free or substantially free of structural features large enough to be capable of scattering visible light, and such films should thus be optically transparent.

Single layer anti-reflective hard-coats may advantageously be applied to any optical systems were the anti-reflective coating is likely to be in contact with some sort of mechanical force, for example where cleaning of the surface may periodically be required. The hard-coats according to the invention could therefore advantageously be applied to any display application in general.

The single layer anti-reflective hard-coats according to the invention show less angle dependence of the anti-reflective performance in comparison to multi-layer systems.

Therefore, the combination of durable mechanical properties as well as improved anti-reflective performance at oblique angles will allow for the use of these single layer anti-reflective hard-coats in applications were mechanical durability and anti-reflective performance at oblique angles or on non-flat substrates are advantageous. These applications include anti-reflective hard coatings for automobile and airplane wind screens, television tubes, flexible displays and spectacles.

In the process according to the invention a first material is used which does not crosslink under the conditions chosen in the subsequent crosslinking step. Thus, in principle, a wide variety of materials are suitable to be used as the first material. However, the combination of the first material and all other materials should advantageously result in a homogenous mixture, which is still homogenous prior to crosslinking. After the induction of crosslinking the mixture phase separates into domains which may advantageously have a size in the order of magnitude of nanometers. Depending on the desired properties of the single layer anti-reflective coating, the size of the domains may be anywhere up to hundreds of nanometers, however smaller domains are preferred.

In order for a material to be suitable as the first material it must be compatible (soluble) in the components comprising the second material. In the framework of the invention a compatible material refers to one which does not lead to phase separation prior to cross-linking, i.e. leads to homogeneous coatings prior to cross-linking. This can be realised by the second material being similar in terms of polarity and chemical structure to the components comprising the second materials but lacking the chemical reactivity toward the chosen crosslinking mechanism. The first material may also undergo specific interaction (e.g. hydrogen bonding) with the components of the second materials, which could lead to compatible (homogeneous) coatings prior to cross-linking.

It has been found that lyotropic liquid crystalline materials are suitable for use as a first material. In a preferred embodiment hydroxypropyl cellulose, being a lyotropic liquid crystalline polymer, is used. Surprisingly hydroxypropyl cellulose is considerably higher in polarity than the components comprising the second material yet show no evidence of macro or micro-phase separation prior to cure. Many materials are in principle suitable as the first material as long as good compatibility exists between the first and second material prior to crosslinking. Suitable therefore are also thermotropic liquid crystalline polymers, non-polymeric liquid crystalline materials and the first material may also be selected from the group consisting of polymeric, non-polymeric and isotropic materials.

In a preferred embodiment the first material is a water-soluble material. Use of a water-soluble first material has the advantage that it allows for the removal of at least part of the first material in an environmentally friendly way, i.e. washing with water.

In the process according to the invention a second material is used which does crosslink under the conditions chosen in the subsequent cross-linking step. In principle, a wide variety of materials is suitable to be used as the second material. However, the combination of the second material and all other materials present in the mixture should advantageously result in a homogenous mixture, which is still homogenous prior to crosslinking.

As mentioned, in principle a wide variety of materials is suitable to be used as the second material, for example monomers or oligomers having crosslinking groups. Monomers or oligomers having only one crosslinking group per molecule may be used, but only in combination with other crosslinking components that do have at least two crosslinking groups. Preferably monomers or oligomers having at least two or more crosslinking groups per molecule are used. It is also possible that the second material comprises a mixture of compounds that after the induction of crosslinking in step b, together form a crosslinked phase. The mixture may comprise compounds that are by itself crosslinking, such as for example different acrylates or it may comprise compounds that will not crosslink by itself but which form a crosslinked phase in combination with another compound after initiation of the crosslinking reaction.

Examples of monomers suitable for use as a second material and having at least two crosslinking groups per molecule include monomers containing (meth)acryloyl groups such as trimethylolpropane tri(meth)acrylate, pentaerythritol (meth)acrylate, ethylene glycol di(meth)acrylate, tetraethylene glycol di(meth)acrylate, polyethylene glycol di(meth)acrylate, 1,4-butanediol di(meth)acrylate, 1,6-hexanediol di(meth)acrylate, neopentyl glycol di(meth)acrylate, polybutanediol di(meth)acrylate, tripropyleneglycol di(meth)acrylate, glycerol tri(meth)acrylate, phosphoric acid mono- and di(meth)acrylates, C7-C20 alkyl di(meth)acrylates, trimethylolpropanetrioxyethyl (meth)acrylate, tris(2-hydroxyethyl) isocyanurate tri(meth)acrylate, tris(2-hydroxyethyl) isocyanurate di(meth)acrylate, pentaerythritol tri(meth)acrylate, pentaerythritol tetra(meth)acrylate, dipentaerythritol monohydroxy pentacrylate, dipentaerythritol hexacrylate, tricyclodecane diyl dimethyl di(meth)acrylate and alkoxylated versions, preferably ethoxylated and/or propoxylated, of any of the preceding monomers, and also di(meth)acrylate of a diol which is an ethylene oxide or propylene oxide adduct to bisphenol A, di(meth)acrylate of a diol which is an ethylene oxide or propylene oxide adduct to hydrogenated bisphenol A, epoxy(meth)acrylate which is a (meth)acrylate adduct to bisphenol A of diglycidyl ether, diacrylate of polyoxyalkylated bisphenol A, and triethylene glycol divinyl ether, adduct of hydroxyethyl acrylate, isophorone diisocyanate and hydroxyethyl acrylate (HIH), adduct of hydroxyethyl acrylate, toluene diisocyanate and hydroxyethyl acrylate (HTH), and amide ester acrylate.

Examples of suitable monomers having only one crosslinking group per molecule include monomers containing a vinyl group, such as N-vinyl pyrrolidone, N-vinyl caprolactam, vinyl imidazole, vinyl pyridine; isobornyl (meth)acrylate, bornyl (meth)acrylate, tricyclodecanyl (meth)acrylate, dicyclopentanyl (meth)acrylate, dicyclopentenyl (meth)acrylate, cyclohexyl (meth)acrylate, benzyl (meth)acrylate, 4-butylcyclohexyl (meth)acrylate, acryloyl morpholine, (meth)acrylic acid, 2-hydroxyethyl (meth)acrylate, 2-hydroxypropyl (meth)acrylate, 2-hydroxybutyl (meth)acrylate, methyl (meth)acrylate, ethyl (meth)acrylate, propyl (meth)acrylate, isopropyl (meth)acrylate, butyl (meth)acrylate, amyl (meth)acrylate, isobutyl (meth)acrylate, t-butyl (meth)acrylate, pentyl (meth)acrylate, caprolactone acrylate, isoamyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, decyl (meth)acrylate, isodecyl (meth)acrylate, tridecyl (meth)acrylate, undecyl (meth)acrylate, lauryl (meth)acrylate, stearyl (meth)acrylate, isostearyl (meth)acrylate, tetrahydrofurfuryl (meth)acrylate, butoxyethyl (meth)acrylate, ethoxydiethylene glycol (meth)acrylate, benzyl (meth)acrylate, phenoxyethyl (meth)acrylate, polyethylene glycol mono(meth)acrylate, polypropylene glycol mono(meth)acrylate, methoxyethylene glycol (meth)acrylate, ethoxyethyl (meth)acrylate, methoxypolyethylene glycol (meth)acrylate, methoxypolypropylene glycol (meth)acrylate, diacetone (meth)acrylamide, beta-carboxyethyl (meth)acrylate, phthalic acid (meth)acrylate, isobutoxymethyl (meth)acrylamide, N,N-dimethyl (meth)acrylamide, t-octyl (meth)acrylamide, dimethylaminoethyl (meth)acrylate, diethylaminoethyl (meth)acrylate, butylcarbamylethyl (meth)acrylate, n-isopropyl (meth)acrylamide fluorinated (meth)acrylate, 7-amino-3,7-dimethyloctyl (meth)acrylate, N,N-diethyl (meth)acrylamide, N,N-dimethylaminopropyl (meth)acrylamide, hydroxybutyl vinyl ether, lauryl vinyl ether, cetyl vinyl ether, 2-ethylhexyl vinyl ether; and compounds represented by the following formula (1)

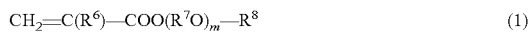

$$CH_2=C(R^6)-COO(R^7O)_m-R^8 \qquad (1)$$

wherein $R^6$ is a hydrogen atom or a methyl group; $R^7$ is an alkylene group containing 2 to 8, preferably 2 to 5 carbon atoms; and m is an integer from 0 to 12, and preferably from 1 to 8; $R^8$ is a hydrogen atom or an alkyl group containing 1 to 12, preferably 1 to 9, carbon atoms; or, $R^8$ is a tetrahydrofuran group-comprising alkyl group with 4-20 carbon atoms, optionally substituted with alkyl groups with 1-2 carbon atoms; or $R^8$ is a dioxane group-comprising alkyl group with 4-20 carbon atoms, optionally substituted with methyl groups; or $R^8$ is an aromatic group, optionally substituted with $C_1$-$C_{12}$ alkyl group, preferably a $C_8$-$C_9$ alkyl group, and alkoxylated aliphatic monofunctional monomers, such as ethoxylated isodecyl (meth)acrylate, ethoxylated lauryl (meth)acrylate, and the like.

Oligomers suitable for use as the second material are for example aromatic or aliphatic urethane acrylates or oligomers based on phenolic resins (ex. bisphenol epoxy diacrylates), and any of the above oligomers chain extended with ethoxylates. Urethane oligomers may for example be based on a polyol backbone, for example polyether polyols, polyester polyols, polycarbonate polyols, polycaprolactone polyols, acrylic polyols, and the like. These polyols may be used either individually or in combinations of two or more. There are no specific limitations to the manner of polymerization of the structural units in these polyols. Any of random polymerization, block polymerization, or graft polymerization is acceptable. Examples of suitable polyols, polyisocyanates and hydroxylgroup-containing (meth)acrylates for the formation of urethane oligomers are disclosed in WO 00/18696, which is incorporated herein by reference.

Combinations of compounds that together may result in the formation of a crosslinked phase and thus that in combination are suitable to be used as the second material are for example carboxylic acids and/or carboxylic anhydrides combined with epoxies, acids combined with hydroxy compounds, especially 2-hydroxyalkylamides, amines combined with isocyanates, for example blocked isocyanate, uretdion or carbodiimide, epoxies combined with amines or with dicyandiamides, hydrazinamides combined with isocyanates, hydroxy compounds combined with isocyanates, for example blocked isocyanate, uretdion or carbodiimide, hydroxy compounds combined with anhydrides, hydroxy compounds combined with (etherified) methylolamide ("amino-resins"), thiols combined with isocyanates, thiols combined with acrylates (optionally radical initiated), acetoacetate combined with acrylates, and when cationic crosslinking is used epoxy compounds with epoxy or hydroxy compounds.

Further possible compounds that may be used as the second material are moisture curable isocyanates, moisture curable mixtures of alkoxy/acyloxy-silanes, alkoxy titanates, alkoxy zirconates, or urea-, urea/melamine-, melamine-formaldehyde or phenol-formaldehyde (resol, novolac types), or radical curable (peroxide- or photo-initiated) ethylenically unsaturated mono- and polyfunctional monomers and polymers, e.g. acrylates, methacrylates, maleate/vinyl ether), or radical curable (peroxide- or photo-initiated) unsaturated e.g. maleic or fumaric, polyesters in styrene and/or in methacrylates.

In a specific embodiment, it is possible that the second material comprises nano-particles present in the mixture as described in step a) of the process according to the invention. In that case, at least a significant part of the nano-particles must have crosslinking groups on their surface, in a preferred embodiment all nano-particles have crosslinking groups on their surface.

The amount of the first material, i.e. the relative amount of all compounds that do not crosslink in step b, but excluding any solvent that may be present in step a), and the amount of the second material, i.e. the relative amount of all compounds that after crosslinking will be part of the crosslinked phase may vary within wide ranges. Preferably, the mixture comprises the second material and the first material in a ratio of between 1:4 to 4:1, more preferably, the mixture comprises the second material and the first material in a ratio of between 2:3 and 3:2.

The concentration of all non-solvent components in a mixture that does comprise at least one solvent may also vary within wide ranges, e.g. between 1 and 95 wt % relative to the total weight of the mixture including the solvent. The concentration of the non-solvent components depends for example on the process by which the mixture is applied to the substrate, the temperature, the viscosity etc.

When the mixture is applied to the substrate by spin coating, the total amount of non-solvent components is typically in the range of 1-20 wt %, relative to the total weight of the mixture.

In the framework of this invention the term "nano-particles" is defined as particles of which the majority has a diameter of less than a micrometer. For non-spherical particles the longest straight line that can be drawn from one side of a particle to the opposite side may be used as the value for the diameter. In a preferred embodiment, the majority of the nano-particles have a diameter of less than 400 nm, more preferably the majority of particles have a diameter of less than 50 nm. Most preferably all particles have a diameter smaller than 50 nm. Most preferably, particles used have such a diameter that they do not (significantly) influence the transparency of the eventual coating. Processes for determining the particle diameter include BET adsorption, optical or scanning electron microscopy, or atomic force microscopy (AFM) imaging.

In the process according to the invention the film may comprise either organic or inorganic nano-particles. Examples of organic nano-particles are carbon nanotubes or nanospheres. Preferably, the nano-particles are inorganic nano-particles. Suitable inorganic particles are for example oxide particles. Preferred oxide particles are particles of an oxide selected from the group of aluminum oxide, siliciumoxide, zirconium oxide, titanium oxide, antimony oxide, zinc oxide, tin oxide, indium oxide, and cerium oxide. It is also possible to use a mixture of particles from different oxides or to use particles of mixed oxides. Preferably, the nano-particles are particles of aluminum oxide, zirconium oxide or silica oxide. The refractive index of the coating and effective refractive index of the coating/air interface can in part be tuned by the choice of oxide used.

In principle a wide variety of nano-particles may be used. However, the combination of the nano-particles and all other materials present in the mixture in step a) of the process according to the invention, should advantageously result in a homogenous mixture, which is still homogenous prior to crosslinking.

It has been found that it is often advantageous to use stabilized nano-particles in the process according to the invention. In the framework of the invention, the term "stabilized particles" means particles that have organic groups on their surface. These organic groups may or may not comprise a polymerizable groups. Herein, nano-particles having crosslinking groups on their surface are called "reactive nano-particles". Such reactive nano-particles may or may not comprise additional, non-polymerizable organic groups. Particles wherein the organic groups on the surface do not comprise any polymerizable group are called "passive nano-particles".

In an advantageous embodiment of the invention, at least part of the nano-particles have crosslinking groups on their surface. In a further preferred embodiment, the nano-particles are metal oxide particles having crosslinking groups on their surface.

In an advantageous embodiment of the process according to the invention, the mixture in step a) consists of or comprises reactive nano-particles, passive nano-particles or a mixture thereof. When the second material in the process according to the invention consists of reactive nano-particles only, no other crosslinking component may be present. The nano-structured film or coating is formed after crosslinking of the crosslinking groups present on the surface of the reactive nano-particles and subsequent removal of at least part of the first material.

In a preferred embodiment of the process according to the invention, all nano-particles are reactive.

The preparation of reactive and passive nano-particles as such is known in the art, and has been described in e.g. U.S. Pat. No. 6,025,455.

The nano-particles used in the process according to the invention are often provided in the form of a suspension. One of the problems encountered with suspensions of (combinations of) mixtures is their stability with respect to phase separation and flocculation. It is a general belief in the art that addition of polymers to a suspension of colloidal particles results in phase separation. This mechanism is known in the literature as 'depletion flocculation' (A. Vrij, Pure & Appl. Chem. 48, 1976, p 471) For example, addition of a common polar linear polymer, i.e. poly(ethyleneglycol) or hyper-branched polyester-amides to a suspension of multi-functional acrylates with nanosilica particles results in inhomogeneous films prior to cure, despite the similarity in polarity.

Surprisingly, it has now been found that the addition of the lyotropic liquid-crystalline hydroxypropyl cellulose does not result in an opaque suspension when added to a mixture of acrylated nano-particles, dipentaerythritolpentaacrylate and ethyxylated trimethylolpropane triacrylated of time in methanol. At room temperature, this mixture is even stable for a considerable period of time.

Without wanting to be bound by theory, it is our current belief that the lyotropic nature of the hydroxypropyl cellulose together with its high hydroxyl functionality may stabilize the suspension from flocculation, thus ensuring homogenous films upon deposition and prior to crosslinking. In a preferred embodiment, hydroxypropyl cellulose is used as the first material in the process according to the invention.

A wide variety of substrates may be used as a substrate in the process according to the invention. Suitable substrates are for example flat or curved, rigid or flexible substrates including films of for example polycarbonate, polyester, polyvinyl acetate, polyvinyl pyrollidone, polyvinyl chloride, polyimide, polyethylene naphthalate, polytetrafluoro ethylene, nylon, polynorbornene or amorphous solids, for example glass or crystalline materials, such as for example silicon or gallium arsenide. Preferred substrates for use in display applications are for example glass, polynorbornene, polyethersulfone, polyethyleneterphtalate, polyimide, cellulose triacetate, polycarbonate and polyethylenenaphtalate.

A free-standing single layer anti-reflective hard-coat film or coating obtainable by a process according to the invention may be obtained by preparing a film or coating on a substrate and subsequently removing the film or coating from the substrate after crosslinking. The removal of the film or coating from the substrate should always take place after crosslinking but may take place before or after removal of the first material.

The mixture may be applied onto the substrate by any process known in the art of wet coating deposition. Examples of suitable processes are spin coating, dip coating, spray coating, flow coating, meniscus coating, capillary coating and roll coating.

In principle it is possible to apply the mixture to the substrate without the use of a solvent, for example by using nano-particles and mixing them into a liquid mixture of the other components. However, often this results in very unstable formulations and/or in an increase in viscosity that makes application of the mixture onto the substrate difficult, especially as very thin films.

Typically, the first material, the second material and the nano-particles are mixed with at least one solvent to prepare a mixture that is suitable for application to the substrate using the chosen method of application. In principle, a wide variety of solvents may be used. However, the combination of the solvents and all other materials present in the mixture should advantageously result in a homogenous mixture, which is still homogenous prior to crosslinking.

Nano-particles typically are added to the mixture in the form of a suspension. The same solvent may be used to adjust the mixture so that it has the desired properties. However, other solvents may also be used Examples of solvent that may be suitable are 1,4-dioxane, acetone, acetonitrile, chloroform, chlorophenol, cyclohexane, cyclohexanone, cyclopentanone, dichloromethane, diethyl acetate, diethyl ketone, dimethyl carbonate, dimethylformamide, dimethylsulphoxide, ethanol, ethyl acetate, m-cresol, mono- and di-alkyl substituted glycols, N,N-dimethylacetamide, p-chlorophenol, 1,2-propanediol, 1-pentanol, 1-propanol, 2-hexanone, 2-methoxyethanol, 2-methyl-2-propanol, 2-octanone, 2-propanol, 3-pentanone, 4-methyl-2-pentanone, hexafluoroisopropanol, methanol, methyl acetate, methyl acetoacetate, methyl ethyl ketone, methyl propyl ketone, n-methylpyrrolidone-2, n-pentyl acetate, phenol, tetrafluoro-n-propanol, tetrafluoroisopropanol, tetrahydrofuran, toluene, xylene and water. Alcohols, ketones and esters based solvents may also be used, although the solubility of acrylates may become an issue with high molecular weight alcohols. Halogenated solvents (such as dichloromethane and chloroform) and hydrocarbons (such as hexanes and cyclohexanes), may also be suitable.

The same solvents may be suitable for washing at least part of the first material away. The preferred solvent for the removal of at least part of the first material is water.

Any cross-linking method that may selectively cause the second material to crosslink but that does not result in crosslinking of the first material is suitable to be used in the process according to the invention. Suitable ways to initiate crosslinking are for example electron beam radiation, electromagnetic radiation (UV, Visible and Near IR), thermally and by adding moisture, in case moisture curable compounds are used as the second material. In a preferred embodiment crosslinking is achieved by UV-radiation. The UV-crosslinking may take place through a free radical mechanism or by a cationic mechanism, or a combination thereof. In another preferred embodiment the crosslinking is achieved thermally.

An initiator may be present in the mixture to initiate the crosslinking reaction. The amount of initiator may vary between wide ranges. A suitable amount of initiator is for example between above 0 and 5 wt % with respect to total weight of the compounds that take part in the crosslinking reaction. The relative amount of initiator will determine the kinetics of the crosslinking step and can thus be used to affect the (nano) surface structure and thus the anti-reflective performance.

When UV-crosslinking is used to initiate crosslinking of the second material, the mixture preferably comprises a UV-photo-initiator. A photo-initiator is capable of initiating a crosslinking reaction upon absorption of light, thus, UV-photo-initiators absorb light in the Ultra-Violet region of the spectrum. Any known UV-photo-initiators may be used in the process according to the invention, with the proviso that the mixture preferably remains homogenous.

Any process that selectively or preferentially removes the first material in step c) while the crosslinked material is not removed or removed to a smaller extent is suitable for use in step c). An example of a process for the removal of the first material is washing with a solvent, in which the first material dissolves and the crosslinked material does not dissolve and/ or does not swell. Preferably, a solvent is used in which only the first material dissolves. Other possible processes are for example evaporation of at least part of the first material or decomposition or degradation or pyrolysis or sublimation of at least part of the first material. Other techniques that may be used are mechanical stripping or brushing. In a preferred embodiment the first material is removed by washing with a solvent. In a further preferred embodiment the first material is at least partially removed with water.

The mixture used in the process according to the invention may also comprise an adhesion promoter. An adhesion promoter is a component that improves the adhesion of the nano-structured film or coating to the substrate. The adhesion promoter is preferably included in the mixture before deposition in an amount ranging from 0.1 to 5 wt % based on the total weight of compounds in the mixture and under the condition that the film is homogenous prior to crosslinking.

Suitable promoters for the adhesion of the film or coating to a glass or other substrates are for example acrylated trimethoxy silane monomers. Examples of silane adhesion promoters include: γ-mercaptopropylmethylmonomethoxysilane, γ-mercaptopropylmethyldimethoxysilane, γ-mercaptopropyltrimethoxysilane, γ-mercaptopropylmonoethoxysilane, γ-mercaptopropyldiethoxysilane, γ-mercaptopropyltriethoxysilane, β-mercaptoethylmonoethoxysilane, β-mercaptoethyltriethoxysilane, β-mercaptoethyltriethoxysilane, N-(2-aminoethyl)-3-aminopropylmethyldimethoxysilane, N-(2-aminoethyl)-3-aminopropyltrimethoxysilane, γ-aminopropyltriethoxysilane, γ-glycidoxylpropyltrimethoxysilane, γ-glycidoxyl propylmethyldimethoxysilane, 2-(3,4-epoxycyclohexyl) ethyltrimethoxysilane, γ-chloropropylmethyldimethoxysilane, γ-chloropropyltrimethoxysilane, and γ-methacryloyloxypropyltrimethoxysilane. Examples of commercially available products of these compounds include SILAACE S310, S311, S320, S321, S330, S510, S520, S530, S610, S620, S710, S810 (manufactured by Chisso Corp.), Silquest A-174NT (manufactured by OSI Specialties—Crompton Corp.). SH6062, AY43-062, SH6020, SZ6023, SZ6030, SH6040, SH6076, SZ6083 (manufactured by Toray-Dow Corning Silicone Co., Ltd.), KBM403, KBM503, KBM602, KBM603, KBM803, KBE903 (manufactured by Shin-Etsu Silicone Co., Ltd.), and the like. Also acidic adhesion promoters such as acrylic acid may be used. Phosphate esters such as Eb168 or Eb170 from UCB are feasible adhesion promoters.

Any other additive may be added to the films or coatings according to the invention. It remains however advantageous that the mixture is homogenous prior to cross-linking.

The composition of the mixture as well as the processes chosen for the various steps and the exact process conditions of the steps in the process according to the invention will together determine the surface structure of the film or coating obtained. The surface structure (i.e. the depth of the troughs and distance between ridges, see FIG. 6) is e.g. affected by temperature, deposition process and the chosen method of crosslinking. If UV radiation is used, the wavelength and the intensity during crosslinking, the amount of photo-initiator and the irradiation time will all influence the surface structure. Secondly the mechanical properties of the film or coating are affected by the chosen methods and conditions. For example, the crosslink density of the crosslinked phase may be increased by heating the film or coating during or after crosslinking. By increasing the crosslink density, the hardness, the modulus and Tg of the resulting film or coating may be increased. Furthermore, such an extra heating step allows the adhesion promoter to react with the substrate and thus improves adhesion and also scratch resistance.

As a result of the above described process, a single layer anti-reflective hard coat is obtained. Such coatings are herein referred to as coatings according to the invention and these coatings typically exhibit a nano-structured surface whereas conventional single layer hard-coats are smooth on the nano-scale level.

In a preferred embodiment, a hard-coat according to the invention has a hardness above 0.5 GPa as measured by nano-indentation. Hardnesses of above 0.7 or even above 1.0 are even more preferred A method of measuring the hardness by nano-indention is described in the experimental section.

In another preferred embodiment, the hard-coat according to the invention has a reduced tensile modulus above 3 GPa, as measured by nano-indentation. A reduced tensile modulus of above 8.5 such as above 20 or above 40 are even more preferred. A method of measuring the reduced tensile modulus by nano-indention is described in the experimental section.

In another preferred embodiment, the hard-coat according to the invention has a scratch resistance above 5 mJ $\mu m^{-3}$ measured by nano-indentation. A scratch resistance of above 15 such as above 30 or even above 60 is more preferred.

It will be appreciated that it is difficult if not impossible to measure hardness, reduced tensile modulus or scratch resistance of hard-coats when they have a structured or nano-structured surface. Therefore, it will be clear to a skilled person that when it is stated herein that a hard-coat according to the invention has a hardness, reduced tensile modulus or scratch resistance of a certain value, that it is meant that the bulk of the material of the hard-coat has these properties.

A method of measuring the scratch resistance by nano-indention has been described in the experimental section.

A further preferred hard-coat combines at least two of the features described above.

In general, the hard-coats according to the invention have a refractive index value that decreases from that refractive index value of the crosslinked phase to that of air over a spatial length scale. Preferably, the length scale of the refractive index gradient is between 10 and 1000 nm, more preferably the length scale is between 100 and 200 nm. The shape of the surface, i.e. the ridges and troughs, achieves the gradient of the refractive index.

In a preferred embodiment of the films or coatings according to the invention, the majority of the ridges are smaller than 1000 nm. A useful way to characterize the surface structure is by using AFM imaging combined with radial density Fourier transformation, as described in Caro et al., Chapter 4, Volume 5 in Handbook of Surfaces and Interfaces of Materials, Ed. H. S. Nalwa, Academic Press, 2001. This analysis function is standard available on AFM instruments of Digital Instruments. Such an approach typically yields a critical length scale, characterizing the surface structure. In an optimum embodiment, this critical length scale is below the wavelength of visible light, i.e. 350 nm. Preferably, the nano-structured films or coatings according to the invention have such a structure that the critical wave vector of the radial fourier density transformation for an uncorrelated density distribution is above 2 pi/600 nm, more preferably above 2 pi/400 nm.

In a preferred embodiment, the nano-structured films or coatings according to the invention do not reduce the optical transmission characteristics of a substrate on which they are present to visible wavelengths of the electromagnetic spectrum.

In another preferred embodiment, the nano-structured films or coatings according to the invention increases the optical transmission of a substrate on which they are present to visible wavelengths of the electromagnetic spectrum.

BRIEF DESCRIPTION OF THE DRAWING FIGURES

FIG. 1: Typical Load-Function used for the indentation Experiments

Figure 2:
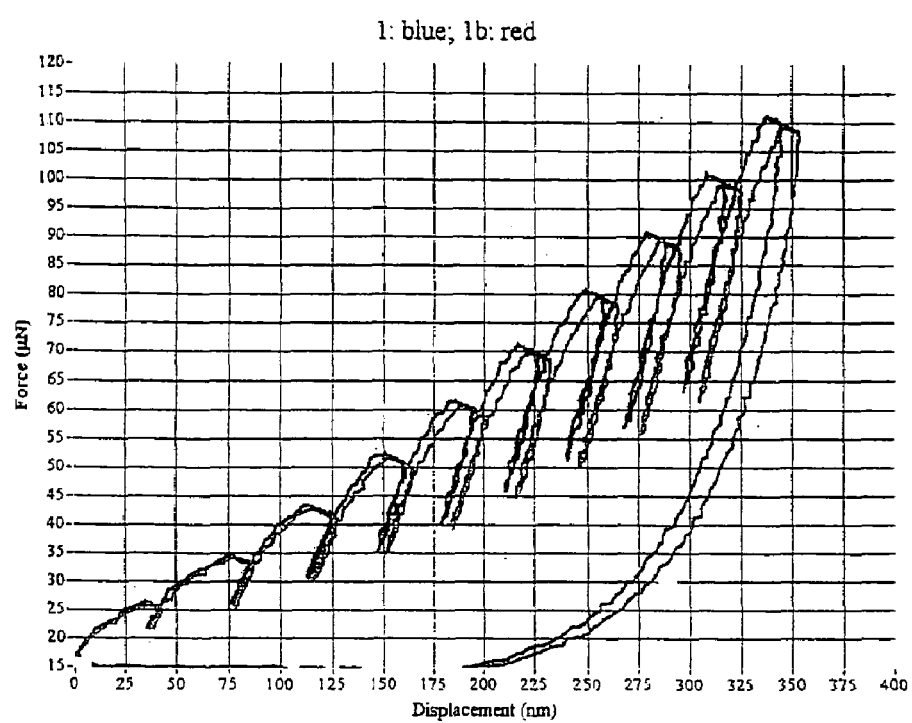

FIG. 2: Typical force displacement curves for 2 comparative experiments of non-surface structured (flat) coating of formulation F showing good experimental reproducibility between the two curves.

Figure 3:
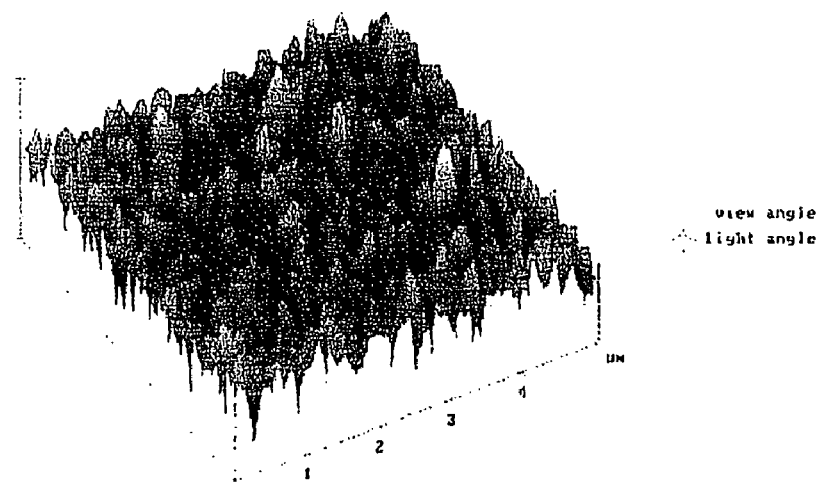

FIG. 3: AFM Image of nano-structured coating of Example formulation 1, showing the surface nano-structure (ridges and troughs). Height resolution is 100 nm. The specifics are as follows: Nanoscope Tapping AFM, Scan size 5.000 µm, Setpoint 0.8448 V, Scan Rate 0.5003 Hz, Number of Samples: 512. 0 deg. X=1.000 µm/div, Z=140.064 nm/div.

Figure 4:
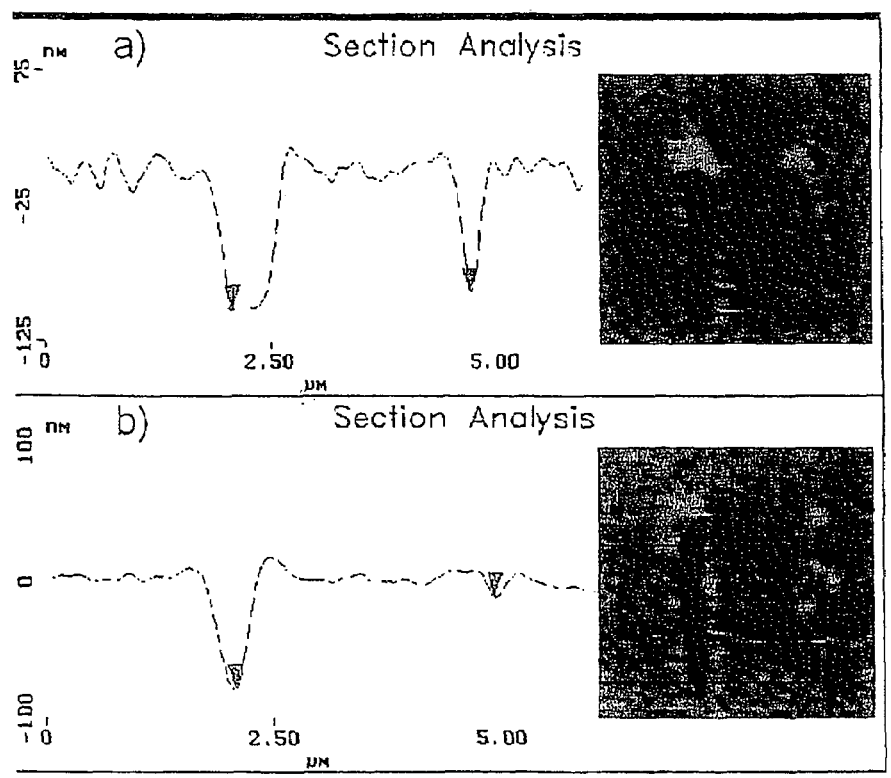

FIG. 4: AFM image showing influence of silane adhesion promoter on scratch resistance. a) cross-section of the scratch at 20 and 50 mN of hard coat post baked without silane adhesion promoter (example formulation 3). b) cross-section of the scratch at 20 and 50 mN of hard coat post baked plus silane adhesion promoter, (example formulation 2).

These AFM images clearly show that the addition of silane adhesion promoter and thermal post-baking increase the scratch resistance of the nano-structured coating.

Figure 5:
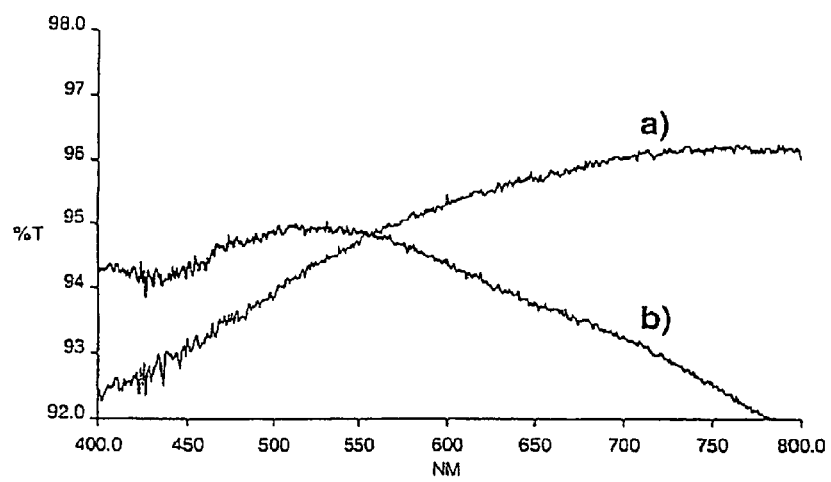

FIG. 5: Visible transmission spectra of glass slide with and without nano-structured coating. a) glass slide with nano-structured coating of Example formulation 1, b) uncoated glass microscope slide.

The transmission spectra clearly show the increased transmission (anti-reflective performance) of the surface structured hard coating with respect to that of the substrate (glass).

FIG. 6: Schematic representation of a typical nano-structured surface, showing the average height of the ridges (h), the average lateral spacing between ridges ($\lambda_C$) and a typical wavelength of visible light ($\lambda_{light}$).

Figure 7:
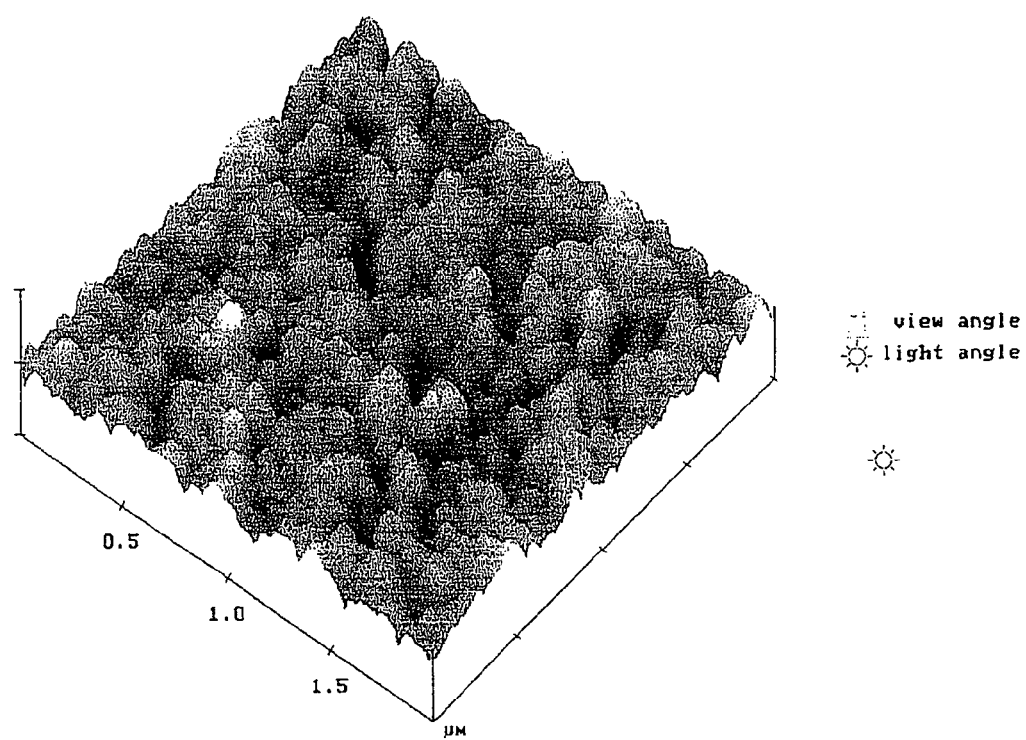

FIG. 7: AFM measurement of the surface of a washed coating of formulation 4. The specifics are as follows: Nanoscope Tapping AFM, Scan size 2.000 µm, Setpoint 1.322 V, Scan Rate 0.5003 Hz, Number of Samples: 512. 0 deg. X=0.500 µm/div, Z=80 nm/div.

Figure 8A:
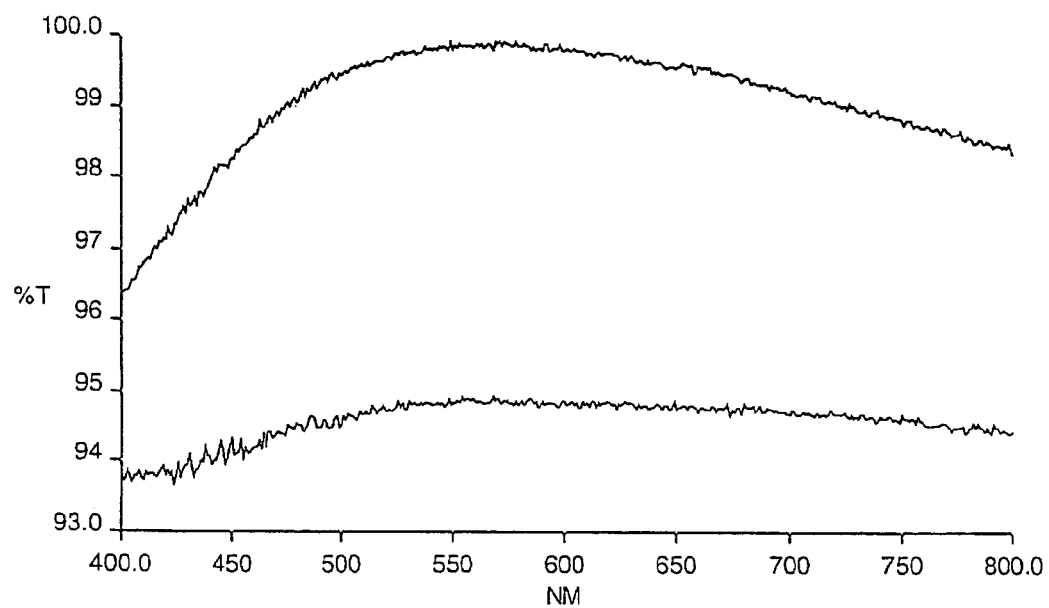

FIG. 8: Panel A: UV Spectrum of glass slide with/without coating topology: glass slide (lower curve), glass slide with nano-structured film (upper curve) Panel B: Chemical structure of Formula 2 and Formula 3.

EXAMPLES

Example 1

Acrylation and Stabilisation of Silica Nanoparticles

Oxide particles may be stabilized by adding a trimethoxy-silane compound comprising an acrylate group (e.g., a compound according to formula 2) together with a compound that inhibits polymerization of the acrylate groups, for example p-methoxy-phenol, to a suspension of the oxide particles in a solvent, for example methyl ethyl ketone. After stirring, a little water is added to the mixture and the mixture is refluxed, for example at 80° C. for 3 hours. Subsequently a dehydrating agent is added to remove any traces of water, and the resultant mixture stirred at 60° C. for one hour. A suitable dehydrating agent is for example trimethyl orthoformate. Another way of preparing stabilized particles (see table 1) is to add a methoxy-silane compound comprising an acrylate group (e.g. according to formula 2) together with a compound that inhibits polymerization of the acrylate groups, for example hydroquinone mono-methylether, to a suspension of the oxide particles in methanol. After stirring, the mixture is refluxed, for example at 60° C. for 3 hours, and subsequently an alkoxy silane compound, for example methyl trimethoxy silane, is added. After refluxing one more hour at 60° C., a dehydrating agent (e.g. trimethyl orthoformate) is added and the resultant mixture stirred at 60° C. for one hour.

TABLE 1

Compounds in weight percentage used for acrylation and stabilization of silica nano particles

| Material | Amount (wt-%) |
| --- | --- |
| MT-ST nano-silica Particle size 10-12 nm | 24.75% |
| Int-12A (trimethyl silane compound) (See formula 2) | 7.84% |
| Hydroquinnone mono-methylether (HQMME stabilizer) | 0.14% |
| Methyltrimethoxysilane (MTMS surface derivatizating agent) | 1.23% |
| Methanol + H$_2$O | 57.75% |
| Trimethyl orthoformate OFM (dehydrating agent) | 8.29% |
| Total | 100% |

Example 2

Preparation of a Film on a Substrate

Thin films of various mixtures were prepared on both microscope glass slides (for transmission measurements) and/or silicon wafers (for measurements of mechanical properties and thickness determination) by the following procedure.

A drop of the formulation was applied to the substrate, and subsequently spincoated at a rate of 4800 r.p.m. The resultant thin wet film was crosslinked with UV using a D-bulb under nitrogen at a dose of 1.7 J/cm2. The thickness of the crosslinked transparent film was measured with a multi-spectral reflectometer (F20, AG Electro optics), giving a value generally in the range of ca 200 nm. Optionally, the crosslinked film was washed with solvent (e.g. water or methanol) to remove at least part of the non cross-linking phase. The resultant average thicknesses of the nano-structured films were generally of the order of 140 nm.

Example 3

Selection of First and Second Materials

Five mixtures were made as comparative examples and compared to the formulations of Example formulation 1. The formulations are shown in Table 2. Thin films of mixtures 1 and comparative experiment formulations B and E were spin-coated on microscope glass slides. Films of Example formulation 1, comparative examples A, C and D were also prepared with a coating bar of 200 μm on a glass plate to give films of tens of microns in thickness. The crosslinked films were washed with a suitable solvent (e.g. methanol) to remove the non-crosslinking component. For water-soluble non-crosslinking components (1, B and D) this washing was done with water. The crosslinked film of comparative experiment formulation C was heated in a vacuum drying oven at 120° C. for 1 hour, to remove the non-crosslinking material (water). The samples were evaluated with the naked eye and using a (polarizing) microscope.

TABLE 2

Formulations used for the determination of selection of first and second materials for examples and comparative experiments.

| | | Example | Comparative experiments | | | | |
|---|---|---|---|---|---|---|---|
| Function definition | Formulation no.<br>Material | 1<br>mg | A<br>g | B<br>mg | C<br>g | D<br>g | E<br>g |
| Nano-particles | Acrylated nano silica (10-20 nm) (cross-linking) | 27.6 | 4.01 | 15.9 | 4.04 | 3.99 | 2.01 |
| First material<br>Non-cross-linking<br>component | Hydroxy propyl cellulose (Mn ca. 10000 g/mol) | 34.7 | — | — | — | — | — |
| | Acetoxy Propyl Cellulose (Mn ca. 10000 g/mol) | — | 5.03 | — | — | — | — |
| | Pol ethylene glycol (Mn. ca. 4000 g/mol) | — | — | 20 | — | — | — |
| | Water | — | — | — | 5.01 | — | — |
| | Hyperbranched polyamide ester (Mn ca. 1200 g/mol) | — | — | — | — | 5.01 | — |
| | 4-cyano-4'-pentylbiphenyl | — | — | — | — | — | 2.54 |
| Second material<br>Cross-linking<br>monomers | Dipentaerythritol pentaacrylate | 14.7 | 2.14 | 8.49 | 2.16 | 2.13 | 1.07 |
| | Ethoxylated (9) trimethylolpropane triacrylate | 9.73 | 1.41 | 5.61 | 1.43 | 1.41 | 0.71 |
| Cross-linking initiator | Photo initiator (Irgacure 184 trademark by Ciba) | 0.27 | 0.037 | 0.15 | 0.037 | 0.039 | 0.019 |
| Solvent | Methanol | 1223 | 113 | 1000 | 113 | 113 | 56.7 |

The crosslinked films of comparative experiment formulations A, C and D were visually opaque and rough before curing, which indicates macro- or micro-phase separation with large phase separated features. The crosslinked films of Example formulation 1 and comparative experiment formulation B and E were visually clear and smooth to the naked eye after crosslinking. However microscopy showed a clear phase separation of the non cross-linking phase before curing, for formulation B and E, which is not seen with microscopy for Example formulation 1. In case of comparative experiment formulation B the phase separation prior to curing can be observed as the development of spherulite like regions in the films by polarizing microscopy. Similarly small optically anisotropic regions of phase separated liquid crystalline 4-cyano-4'-pentylbiphenyl can be seen prior to crosslinking in comparative experiment formulation E by polarizing microscopy. As these features can be seen by microscopy, or even the naked eye it is obvious that they will generate nano structure unsuitable for anti-reflective applications.

The nano structured surface of the crosslinked and washed film of Example formulation 1 can be observed with AFM, see FIG. 3.

Example 4
Measurement of Hardness and Reduced Modulus of Coatings

To determine the hardness and reduced modulus of the spincoated coatings, six flat samples were prepared without a washing step. The formulations used are shown in Table 3. The hardness measurements were performed with a Hysitron TriboScope, using a calibrated Berkovich diamond tip as indenter. The tip was inserted into the coatings with a known load, and the penetration depth in the coating was recorded. A typical load function used is shown in FIG. 1, the resultant force-displacement curve is shown in FIG. 2. The hardness was calculated via the relationship $H$ (in GPa)$=F_{max}/24.5\, d^2$, where $F_{max}$ is the highest load applied and $d$ is the penetration depth. The reduced modulus was calculated from the force-displacement curve using $E_r = 0.5\, (\pi/24.5\, d^2)^{1/2}\, (\delta F/\delta d)$. More details concerning nano-indentation experiments may be found in F. J. Balta Calleja & S. Fakirov, Microhardness of Polymer, Cambridge Un. Press, 2000.

TABLE 3

Formulations used for the determination of hardness, reduced modulus and scratch resistance for examples and comparative experiments

| Function definition | Formulation no. Material | Example 1 mg | Example 2 mg | Example 3 mg | F mg | G mg | H mg | I mg | J mg | K g | L mg |
|---|---|---|---|---|---|---|---|---|---|---|---|
| Nano-particles | Acrylated nano silica (10-20 nm) (cross-linking) | 27.6 | 27.2 | 26.6 | — | — | — | — | 54.4 | — | 69.5 |
| First material (Non-cross-linking component) | Hydroxy propyl cellulose (Mw ca. 80000 g/mol) | 34.7 | 34.6 | 34.0 | — | — | — | — | — | — | — |
| | Poly methyl methacrylate | — | — | — | — | — | — | — | — | 1.56 | — |
| Second material (Cross-linking component) | Dipentaerythritol pentaacrylate | 14.7 | 14.5 | 14.2 | — | 95.8 | 99.9 | — | 29.0 | — | 37.1 |
| | Ethoxylated (9) trimethylolpropane triacrylate | 9.73 | 9.60 | 9.37 | — | 67.1 | 70.0 | — | 19.2 | — | 24.6 |
| | Tri methoxy silane acrylate (silane adhesive promoter) | — | 1.07 | — | — | — | — | — | — | — | — |
| | Liquid crystal diacrylate (See formula 3) | — | — | — | — | — | — | 517 | — | — | — |
| | Ethoxylated nonyl phenol acrylate | — | — | — | 82.9 | — | — | — | — | — | — |
| | Poly ether urethane acrylate (Mn ca. 1600 g/mol) | — | — | — | 465 | — | — | — | — | — | — |
| Cross-linking initiator or co-catalyst | Photo initiator (Irgacure 184 trademark by Ciba) | 0.27 | 0.12 | 0.14 | 29.4 | 1.18 | 1.62 | 5.23 | 0.27 | — | 0.34 |
| | Acyl phosphine oxide (Lucirin) | — | — | — | 14.4 | — | — | — | — | — | — |
| Solvents | Methanol | 1223 | 2024 | 1930 | 1400 | 301 | 588 | 4597 | 1979 | — | 1884 |
| | Tetrahydrofuran | — | — | — | — | — | — | — | — | 13.5 | — |

The values obtained from these six flat (non surface structured) samples are shown in Table 4. The hardness and reduced modulus results show that coatings prepared from a mixture comprising reactive nano-particles have a higher hardness and modulus than coatings prepared from mixtures without (reactive) nano particles. Furthermore, a significant increase in hardness and reduced modulus can be achieved in crosslinked systems comprising monomers of functionality greater than 2 with respect to crosslinking groups.

TABLE 4

Hardness testing on different formulations

| Formulation | Hardness at $F_{max}$ (GPa) | Reduced modulus (GPa) |
|---|---|---|
| F | 0.22 +/− 0.1 | 2.2 +/− 0.2 |
| H | 0.6 +/− 0.1 | 3.7 +/− 0.3 |
| I | 0.2 +/− 0.1 | 2.5 +/− 0.5 |

TABLE 4-continued

Hardness testing on different formulations

| Formulation | Hardness at Fmax (GPa) | Reduced modulus (GPa) |
|---|---|---|
| J | 1.1 +/− 0.2 | 40-80 |
| K | 0.35 +/− 0.05 | 7 +/− 1 |
| L | 1.1 +/− 0.2 | 40-80 |

Example 5

Measurement of the Scratch Resistance of Coatings

To determine the scratch resistance, five flat samples were prepared without the washing step as described under "Preparation of a coating on a substrate". The formulations used are shown in Table 3. The measurements were performed with a Hysitron TriboScope, using a calibrated Berkovich diamond tip as indenter. Prior to a measurement, the coating surface was scanned using the Hysitron Triboscope in an AFM mode. The tip was then inserted into the coating with a certain load, and pulled through the coating at a speed of 20 µm s$^{-1}$. During this the energy $U_{scratch}$ dissipated due to the lateral scratch movement was recorded. After the scratching the coating was again examined using the Hysitron Triboscope in an AFM mode. The volume ΔV removed during the scratch loading was calculated. The scratch resistance is then defined as Sr=ΔV/$U_{scratch}$.

The results of the nano-scratch testing on flat (non surface structured) samples are shown in Table 5, in units mJ/µm$^{-3}$. The results show that a formulation consisting of multi-functional acrylates with or without active nano particles has a much higher scratch resistance than a glassy acrylate coating (comparative experiment formulation F), or a PMMA coating (comparative experiment formulation K).

TABLE 5

Scratch testing on different formulations

| Formulation | Scratch resistance |
|---|---|
| F | 3.45 |
| G | 63.7 |
| H | 59.8 |
| K | 2.35 |
| L | 58.9 |

Example 6

Scratch Resistance of Nano-Structured Films or Coatings

Three nano-structured coatings were prepared with example formulations 2 and 3 (Table 3) as described under "Preparation of a coating on a substrate". After the washing step an additional heat treatment was performed at 100° C. for 30 minutes on selected samples. An AFM image of a resulting (nano) surface structure for Example I is shown in FIG. 3. Nano scratch tests were performed on such nano-structured coatings as described in the previous Example. An AFM image of a nano-structured coating after scratching is shown in FIG. 4.

The results are shown in Table 6. The nano-structured surface inherently decreases the scratch resistance of the coating with respect to the same coating material without surface structuring. Surprisingly, the scratch resistance of a formulation containing an adhesion promoter and with a heat treatment is significantly higher than that without.

TABLE 6

Scratch testing on different formulations showing the effect of silane adhesion promoter and post-baking

| Formulation | Silane adhesion promoter added | Postbaking | Scratch resistance |
|---|---|---|---|
| 2 | Yes | Yes | 1.37 |
| 2 | Yes | Yes | 1.2 |
| 3 | No | Yes | 0.85 |
| 3 | No | No | 0.54 |
| 3 | No | No | 0.96 |

Example 7

Optical Properties of Nanosurface Structured Coatings

Nano-structured films were prepared as described under "Preparation of a coating on a substrate", on one side of glass microscope slides from Example formulation 1. Spectral transmission in the visible region of the spectrum was measured with a Perkin-Elmer Lambda-20 UV-Vis spectrometer. The transmission is shown in FIG. 5, together with the transmission of the uncoated glass slide. The transmission clearly increases by application of the single nano-structured coating.

Example 8

Optical Properties of Other Nano-Surface Structured Coatings

Nano-structured films were prepared as described under "Preparation of a coating on a substrate", on a silicon wafer and on both sides of a glass microscope slide from Example formulation 4 (see Table 7). An AFM image of a resulting surface structure is given in FIG. 7. Spectral transmission in the visible region of the spectrum was measured with a Perkin-Elmer Lambda—20 UV-Vis spectrometer. The transmission is shown in FIG. 8, together with the transmission of the uncoated glass slide. The transmission increases by application of the single nano-structured coating.

TABLE 7

Formulations used for the examples

| Function definition | Formulation no. | Example 4 mg |
|---|---|---|
| Nano-particles | Acrylated nano-silica (10-15 nm) (cross-linking) | 21.2 |
| First material (non-cross-linking component) | Glycerol propoxylated (8POH) | 13.6 |
| Second material (cross-linking component) | Ethoxylated (9) trimethylolpropane triacrylate | 7.64 |
| | Dipentaerythritol pentaacrylate | 0.107 |
| | Adhesion promoter | 0.865 |

TABLE 7-continued

Formulations used for the examples

| Function definition | Formulation no. | Example 4 mg |
|---|---|---|
| Cross-linking initiator | Photo initiator (Irgacure 184 trademark by Ciba) | 27.8 |
| Solvent | Methanol | 921 |

Formula 2: Int-12A

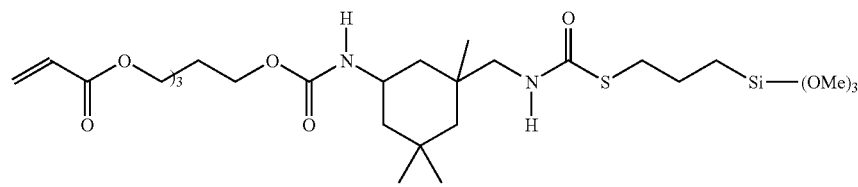

Formula 3: Liquid crystalline diacrylate

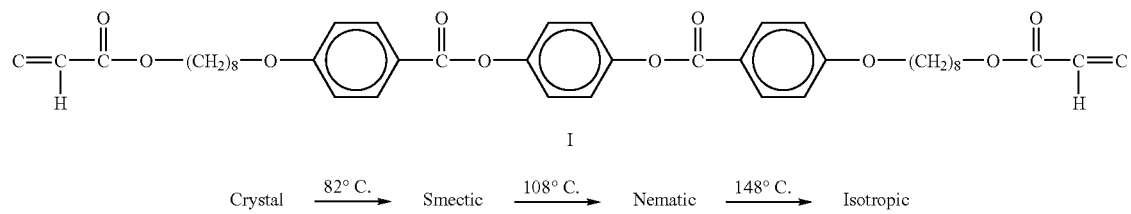

The invention claimed is:

1. A single layer anti-reflective hard-coat which comprises between 5 to 75 weight % of inorganic nano-particles to provide the hard-coat with a nano-structured surface having randomly distributed ridges and troughs,
   wherein the ridges having a height in the range of 50-200 nm and distances between ridges is less than about 400 nm,
   wherein the hard-coat increases an optical transmission of a substrate on which the hard-coat is formed in at least a range of wavelengths of the electromagnetic spectrum and exhibits a refractive index gradient normal to the substrate that decreases from that of the hard-coat to that of air over a spatial length scale,
   wherein the hard-coat has a hardness above 0.7 GPa and scratch resistance above 5 mJ $\mu m^{-3}$, as measured with nano-indentation on a bulk material that is used to make the hard-coat, and
   wherein the hard-coat is prepared by a process comprising the steps of:
   a) applying a mixture on a substrate, which mixture comprises
      i. at least a first material which does not crosslink under the conditions chosen in step b), said first material being hydroxypropyl cellulose
      ii. at least a second material which does crosslink under the conditions chosen in step b)
      iii. nano-particles, and
      iv. optionally at least one solvent
   b) inducing crosslinking in the mixture applied to the substrate, subsequently removing at least part of the first material.

2. A single layer anti-reflective hard-coat according to claim 1, having a hardness of above 1.0 GPa.

3. A single layer anti-reflective hard-coat according to claim 1 having a reduced tensile modulus above 3 GPa as measured by nano-indentation.

4. A composite structure comprising a single layer anti-reflective hard-coat according to claim 3 wherein the hard-coat has a reduced tensile modulus above 8.5 GPa.

5. A composite structure comprising a single layer anti-reflective hard-coat according to claim 3 wherein the hard-coat has a reduced tensile modulus above 20 GPa.

6. A composite structure comprising a single layer anti-reflective hard-coat according to claim 3 wherein the hard-coat has a reduced tensile modulus above 40 GPa.

7. A single layer anti-reflective hard-coat according to claim 1 having a scratch resistance above 15 mJ $\mu m^{-3}$ as measured by nano-indentation.

8. A single layer anti-reflective hard-coat according to claim 7, having a scratch resistance above 30 mJ $\mu m^{-3}$ as measured by nano-indentation.

9. A single layer anti-reflective hard-coat according to claim 7, having a scratch resistance above 60 mJ $\mu m^{-3}$ as measured by nano-indentation.

10. A single layer anti-reflective hard-coat according to claim 1 containing from 15 to 50 weight % of inorganic nano-particles.

11. Shaped articles comprising a single layer anti-reflective hard-coat according to claim 1.

* * * * *